United States Patent [19]
Woida

[11] 3,747,278
[45] July 24, 1973

[54] TOOL AND WORKPIECE HOLDER

[76] Inventor: Arthur F. Woida, 1934 W. Forest Home Ave., Milwaukee, Wis. 53204

[22] Filed: July 30, 1971

[21] Appl. No.: 167,626

[52] U.S. Cl. .................................. 51/45, 51/93
[51] Int. Cl. ........ B24b 7/00, B24b 9/00, B24b 3/00
[58] Field of Search ........................ 51/45, 92, 93

[56] References Cited
UNITED STATES PATENTS

| | | | |
|---|---|---|---|
| 2,386,283 | 10/1945 | Wiken et al. | 51/93 |
| 2,589,165 | 3/1952 | Toy et al. | 51/173 X |
| 2,486,108 | 10/1949 | Brunel | 51/93 |
| 2,859,564 | 11/1958 | Farmer et al. | 51/93 |

Primary Examiner—James L. Jones, Jr.
Attorney—Arthur L. Morsell, Jr. et al.

[57] ABSTRACT

A portable electric drill is removably supported in a cage above a horizontal work table with the drill's tool shaft extending horizontally above the table. A grinding wheel is mounted on the end of the tool shaft. The work table is adapted to hold workpieces and is movable in a horizontal plane transverse to the axis of the tool shaft. The cage which holds the drill is movable in a horizontal plane parallel to the axis of the tool shaft and can also be moved up and down with respect to the work table.

7 Claims, 5 Drawing Figures

PATENTED JUL 24 1973　　　　　　　　　　　　　　　3,747,278

INVENTOR
ARTHUR F. WOIDA

BY
Morsell & Morsell
ATTORNEYS

INVENTOR
ARTHUR F. WOIDA

BY
Morsell & Morsell
ATTORNEYS

TOOL AND WORKPIECE HOLDER

BACKGROUND OF THE INVENTION

This invention relates to portable electric tools of the type which have a removable rotary tool shaft, e.g. electric drills or the like. Many different types of portable electric drills have been manufactured in the past which are capable of utilizing grinding wheels, buffing wheels, and other wheel-shaped tools for enlarging the range of metal-working operations that can be performed by the drill. In the past, however, such wheel-shaped tools have been of limited application due to the fact that most grinding operations require more accuracy than can be obtained with a portable, hand-held tool.

Accordingly, a general object of this invention is to provide a tool and workpiece holder in which a portable electric tool having a removable shaft with a wheel-shaped tool on the end of the shaft can be used to accurately grind and polish surfaces on a workpiece.

Another object of this invention is to provide a tool and workpiece holder as described above which is relatively low in cost.

A further object of this invention is to provide a tool and workpiece holder as described above which is relatively simple in structure and reliable in operation.

SUMMARY OF THE INVENTION

In accordance with this invention, a portable electric drill is removably supported in a cage above a horizontal work table with the drill's tool shaft extending horizontally above the table. The work table is adapted to hold workpieces and a gear and rack arrangement is provided to move the work table in a horizontal plane transverse to the axis of the tool shaft. The cage which holds the tool is movable in a horizontal plane parallel to the axis of the tool shaft and can also be moved up and down with respect to the work table. This provides a stable and accurately adjustable carrier for both the workpiece and the portable tool so that surface grinding requiring a considerable degree of accuracy can be performed on a wide variety of workpieces.

DETAILED DESCRIPTION OF THE INVENTION

Figure 1:
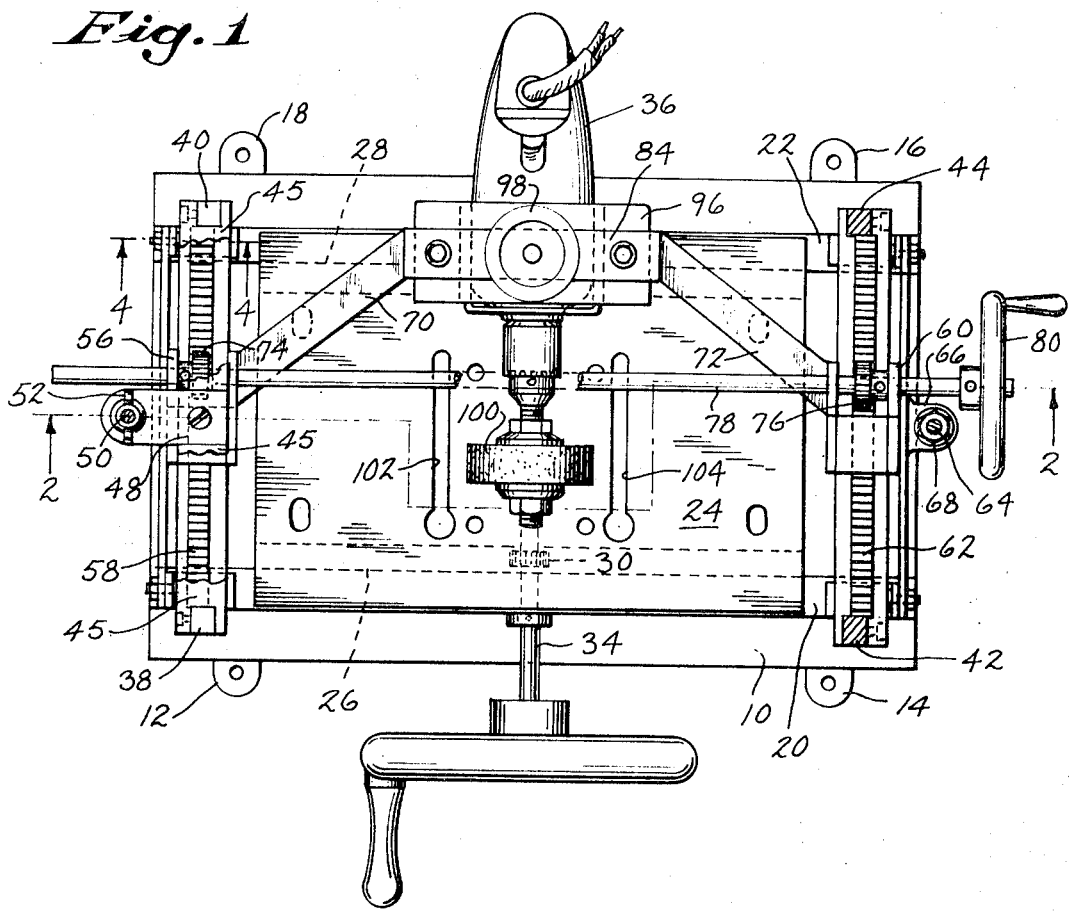
FIG. 1 is a plan view of one illustrative embodiment of the invention.
Figure 4:
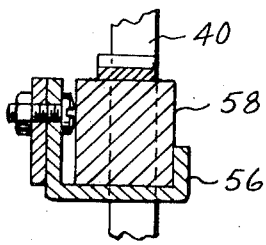
FIG. 4 is an enlarged detail taken on the line 4—4 of FIG. 1.
Figure 2:
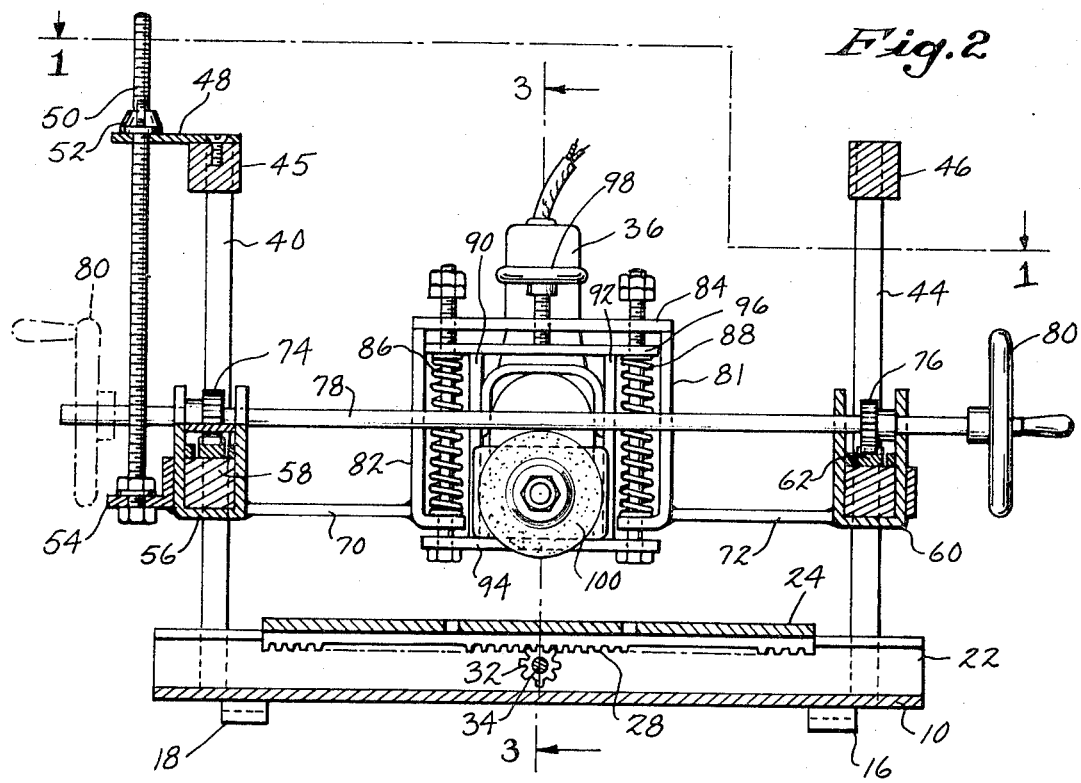
FIG. 2 is a cross-sectional view taken on the line 2—2 of FIG. 1.
Figure 3:
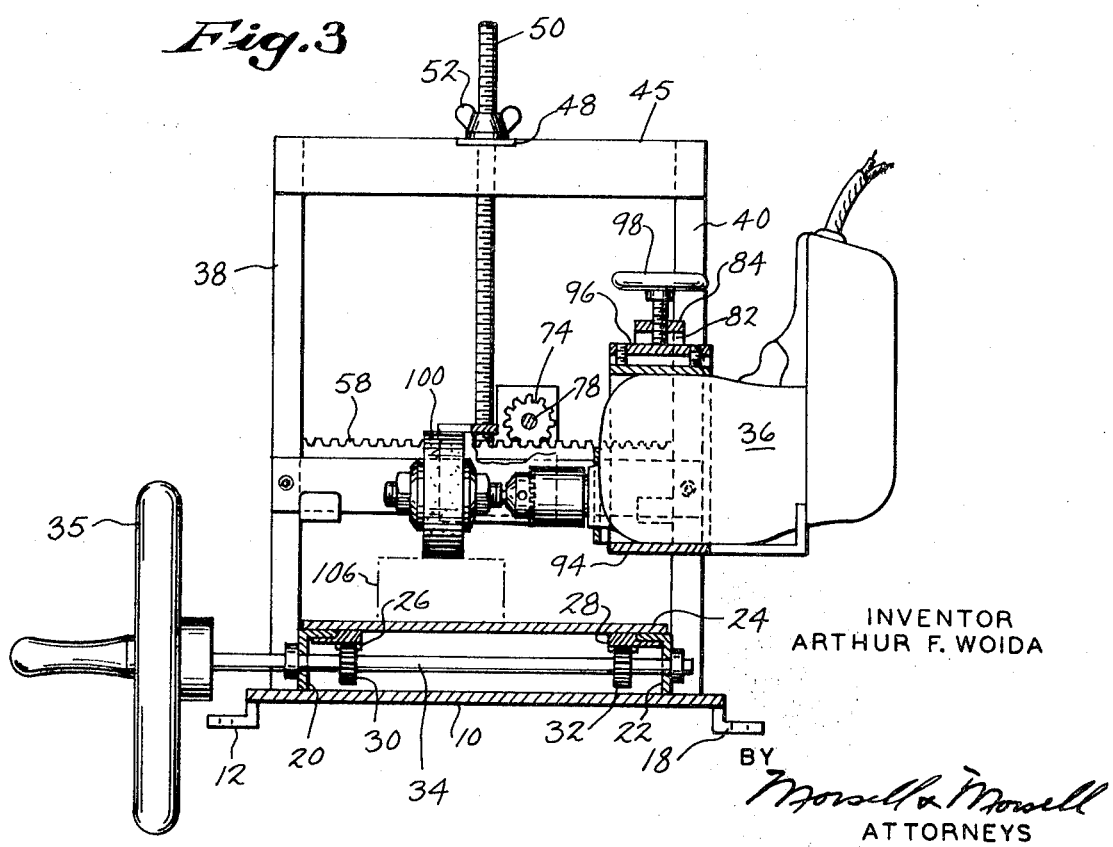
FIG. 3 is an elevational sectional view taken on the line 3—3 of FIG. 2.

Referring to FIGS. 1, 2, and 3, one embodiment of the invention comprises a flat base member 10 which is supported by four short L-shaped legs 12, 14, 16, and 18, all of which have holes drilled in their central portion to receive wood screws or machine screws to securely hold the base 10 in position on top of another surface. Attached to the front and rear of the base member 10 are two horizontally-disposed angle irons 20 and 22 which are situated as supporting elements for a work table 24 which is slideably mounted on the two angle irons 20 and 22. On the bottom of work table 24 are two racks 26 and 28 which are engaged by gears 30 and 32 for moving the table 24 back and forth in the horizontal plane over the angle irons 20 and 22. The gears 30 and 32 are attached to a shaft 34 that extends rotatably through the angle irons 20 and 22 and has a manual crank 35 attached to one end for conveniently adjusting the table 24 manually.

A portable electric drill 36 is supported in an upper frame work which is attached to the base member 10 via four upright members 38, 40, 42, and 44. The upright members 38 and 40 are held together at their upper portion by a cross member 45 (see FIG. 3) and the upright members 42 and 44 are joined together by a similar cross member 46 (see FIG. 2).

A bracket 48 is attached to the top of the cross member 44 for supporting a bolt 50 which passes through an opening in the bracket 48 and is secured thereto by a wing nut 52. At its lower end, the bolt 50 engages a lower bracket 54 which is welded to a U-shaped member 56 that supports a rack 58 which extends substantially parallel to the work table 24 at a distance thereabove which is variable by means of the wing nut 52. On the other side of the work table 24, a similar U-shaped channel 60 and rack 62 (see FIG. 1) are supported by a bolt 64 (FIG. 1) which extends downwardly from a bracket 66 which is attached to the cross member 46. The bolt 64 is held against the bracket 66 by a wing nut 68 by which the rack 62 can be moved upwardly and downwardly with respect to the framework of the device.

A cradle for holding the drill 36 is attached to the two side U-shaped members 56 and 60 by means of supporting brackets 70 and 72. The position of brackets 70 and 72 can be moved horizontally parallel to the axis of the drill shaft by means of a pair of gears 74 and 76 which are mounted on a shaft 78 which passes rotatably through openings formed in the U-shaped members 56 and 60 and has a manual adjustment wheel 80 attached to one end thereof. Turning the adjustment wheel 80 causes the gears 74 and 76 to roll along their opposing racks 58 and 62 and thereby to move the brackets 70 and 72 horizontally parallel to the axis of the drill 36.

The electric drill 36 is supported by two cages: an inner cage and an outer cage. The brackets 70 and 72 are attached by welding to the outer cage which comprises upright members 81 and 82 and upper cross member 84. The upright members 81 and 82 are bent inwardly at their lower ends to support the bottom ends of two springs 86 and 88 which communicate between the outer frame and inner frame of a drill support member. The inner cage comprises two upright members 90 and 92 and two cross members 94 and 96. The upper end of the cross member 96 bears against the top of the spring members 86 and 88. Thus the springs 86 and 88 act between the inner and outer cages for resiliently supporting the drill 36. The displacement of the two cages relative to each other can be manually adjusted by means of a hand wheel 98, which causes a vertical movement of the drill 36. As shown in FIGS. 1, 2, and 3, the drill 36 is held within the inner cage with the shaft of the drill extending horizontally above work table 24, and with a grinding wheel 100 coupled to the end of the tool shaft.

Figure 5:
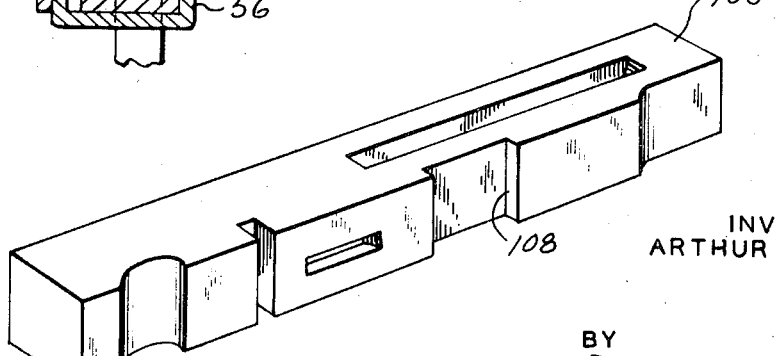
FIG. 5 is a perspective view of a workpiece having various types of surface grinding cuts made therein.

The work table 24 has grooves 102 and 104 (FIG. 1) formed therein for receiving fixtures for holding a workpiece in position on the work table. FIG. 5 shows the different kinds of cuts that can be made upon a workpiece with the tool holder of this invention.

In operation, the workpiece 106 is attached to the work table 24 either directly or in a fixture; the horizontal position of the grinding wheel 100 is set by adjusting the hand wheels 35 and 80, and the vertical position is set by means of the thumb screws 52 and 68 and the hand wheel 98. The drill is then started, and as the rotating grinding wheel 100 bites into the work, the appropriate wheel is turned to feed the workpiece across the cutting surface, depending on the kind of cutting being done. In the workpiece 106 shown in FIG. 5, cutting of a slot such as 108 would require positioning the wheel 100 transverse to the workpiece 106 and then moving the wheel downwardly to cut the slot. The downward movement of the grinding wheel would be effected by means of the hand wheel 98 and thumb screws 52 and 68. For other cuts, the hand wheels 34 and 80 will be used, depending upon the requirements of the work. In general terms, the hand wheel 34 adjusts the horizontal position of the work table 24 transverse to the axis of the grinding wheel 100; the hand wheel 80 controls the horizontal position of the grinding wheel 100 parallel to the axis thereof; and the hand wheel 98 and thumb screws 52 and 68 control the height of the grinding wheel above work table 24.

From the foregoing description it will be clear that this invention provides a tool and workpiece holder for a portable electric tool whereby accurate surface grinding can be done in a convenient manner. And although this invention has been illustrated with reference to a specific embodiment, it should be understood that the invention is by no means restricted to the disclosed embodiment since many modifications can be made in the disclosed structure without altering the essential operating principles thereof. Accordingly, this invention includes all modifications falling within the scope of the following claims.

I claim:

1. A tool and workpiece holder comprising a base member, a portable rotary electric tool of the type having a rotary tool shaft, a wheel-shaped tool on the end of said tool shaft, means for supporting said portable electric tool above said base member for vertical and horizontal movement, a horizontal table for receiving and supporting a workpiece, said table being movably mounted between said base member and said portable electric tool for horizontal movement in one direction with respect to the axis of said tool shaft, rack and gear means for causing said horizontal movement of the table, rack and gear means between the base member and portable electric tool causing said portable electric tool to move in a horizontal plane at right angles to the direction of movement of the table, and means for causing said portable electric tool to move vertically with respect to said base member, wherein said means for supporting said portable electric tool includes an inner cage for receiving said portable electric tool, an outer cage surrounding said inner cage, and spring means extending between said inner and outer cages for resiliently supporting the inner cage.

2. A tool and workpiece holder as defined in claim 1 and further comprising means for manually adjusting the position of said inner cage relative to said outer cage.

3. A tool and workpiece holder comprising a horizontal table for receiving and supporting a workpiece, a portable rotary electric tool of the type having a rotary tool shaft, a wheel-shaped tool on the end of said tool shaft, means for supporting said electric tool above said table with said tool shaft in a horizontal position above said table, said table being movably mounted on a base for horizontal movement in one direction with respect to the axis of said tool shaft, means for moving said portable electric tool in a horizontal plane in a direction at right angles to the direction of movement of the table, and means for moving said portable electric tool vertically with respect to said base member.

4. A tool and workpiece holder as defined in claim 3 wherein said means for supporting said portable electric tool comprises an inner cage for receiving said portable electric tool, an outer cage surrounding said inner cage, and spring means extending between said inner and outer cage for resiliently supporting said inner cage.

5. A tool and workpiece holder as defined in claim 4 and further comprising means for manually adjusting the position of said inner cage relative to said outer cage.

6. A tool and workpiece holder as defined in claim 4 wherein said outer cage is movably mounted on said base for movement in a horizontal plane parallel to the axis of said tool shaft and for vertical movement with respect to said base member.

7. A tool and workpiece holder as defined in claim 6 wherein said outer cage is movably mounted on said base by means of a rack and gear combination.

* * * * *